(12) United States Patent
Underwood et al.

(10) Patent No.: US 12,229,048 B2
(45) Date of Patent: Feb. 18, 2025

(54) MECHANISM TO ENABLE OUT-OF-ORDER PACKET PROCESSING IN A DATATYPE ENGINE

(71) Applicant: Hewlett Packard Enterprise Development LP, Spring, TX (US)

(72) Inventors: Keith D. Underwood, Powell, TN (US); Robert L. Alverson, Seattle, WA (US); Christopher M. Brueggen, Allen, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/085,092

(22) Filed: Dec. 20, 2022

(65) Prior Publication Data

US 2024/0202118 A1 Jun. 20, 2024

(51) Int. Cl.
*G06F 12/0802* (2016.01)
*G06F 5/06* (2006.01)
*G06F 13/28* (2006.01)

(52) U.S. Cl.
CPC ............ *G06F 12/0802* (2013.01); *G06F 5/06* (2013.01); *G06F 13/28* (2013.01); *G06F 2212/1016* (2013.01)

(58) Field of Classification Search
CPC .......................... G06F 9/45558; H04L 63/0272
See application file for complete search history.

(56) References Cited

U.S. PATENT DOCUMENTS 6,820,264 B1 11/2004 Bashkansky et al.
9,569,391 B2 2/2017 Bubb et al.
9,575,765 B2 2/2017 Forsyth et al.
10,095,433 B1 10/2018 Gao
2009/0016217 A1* 1/2009 Kashyap ............. H04L 47/2441
370/231
2017/0026004 A1* 1/2017 Stuenkel ............. H03F 3/45475
2017/0118071 A1* 4/2017 Rasor .................. H04L 41/0672
(Continued)

OTHER PUBLICATIONS

Alexandra et al., "On the Expected and Observed Communication Performance with MPI Derived Datatypes", Proceedings of the 23rd European MPI Users's Group Meeting, 2016, 13 pages.
(Continued)

*Primary Examiner* — Getente A Yimer
(74) *Attorney, Agent, or Firm* — Yao Legal Services, Inc.

(57) ABSTRACT

A network interface card (NIC) receives packets corresponding to a read or write request, the packets associated with a datatype descriptor stored in a datatype engine of the NIC, and each packet associated with a precomputed context which indicates a value for each dimension of a multidimensional array and a start location of the respective packet within a host memory block. The NIC generates, for a respective packet, a datatype handle corresponding to the datatype descriptor and an offset indicating a position of the respective packet within the packets. The NIC determines, based on the datatype handle and the offset, a cached context for the respective packet and initializes the datatype engine based on the cached context. The datatype engine generates, based on the cached context, read or write requests comprising addresses and lengths, thereby allowing the NIC to process out-of-order packets based on the precomputed and cached context.

20 Claims, 7 Drawing Sheets

(56) References Cited

U.S. PATENT DOCUMENTS

2017/0353384 A1* 12/2017 Chayat ................ G06F 9/45558
2019/0116127 A1* 4/2019 Pismenny ........... H04L 63/0272
2020/0259759 A1 8/2020 Shalev et al.

OTHER PUBLICATIONS

Bernard et al., "Studying Quarks and Gluons on MIMD Parallel Computers," International Journal of High Performance Computing Applications, vol. 5, No. 4, 1991, 2 pages.

Hoefler et al., "Parallel Zero-Copy Algorithms for Fast Fourier Transform and Conjugate Gradient using MPI Datatypes", Recent Advances in the Message Pacing Interface (EuroMPI'10), 2010, 9 pages.

Jenkins et al., "Processing MPI Derived Datatypes on Noncontiguous GPU-Resident Data", IEEE Transactions on Parallel and Distributed Systems, vol. XX, No. XX, 2020, 11 pages.

McCalpin et al., "Memory Bandwidth and Machine Balance in Current High Performance Computers", Dec. 1995, 8 pages.

Message Passing Interface Forum, "MPI: A Message-Passing Interface Standard Version 3.1", Jun. 4, 2015, 868 pages.

Prabhu et al., "DAME: A Runtime-Compiled Engine for Derived Datatypes", Proceedings of the 22nd European MPI Users' Group Meeting, 2015, 25 pages.

Schneider et al., "Micro-Applications for Communication Data Access Patterns and MPI Datatypes", 9th European MPI Users' Group Meeting, EuroMPI 2012, 10 pages.

Schneider et al., "MPI Datatype Processing using Runtime Compilation", 20th European MPI Users's Group Meeting, 2013, 6 pages.

Wong et al., "NAS Parallel Benchmarks I/O Version 2.4", Jan. 2003, 6 pages.

Xiong et al., "MPI Derived Datatypes: Performance and Portability Issues", Proceedings of the 25th European MPI Users, 2018, 10 pages.

* cited by examiner

FIG. 1

```
MPI_Type_contiguous(3, MPI_FLOAT,
    &su3_vector_mpi_t);
MPI_Type_vector(squaresize[TUP],
    squaresize[XUP]*squaresize[YUP]/2,
    squaresize[XUP]*squaresize[YUP]
        *squaresize[ZUP]/2,
    su3_vector_mpi_t,
    &field_neighbor_ddt[0][0][ZUP]);

MPI_Type_vector(
    squaresize[ZUP]*squaresize[TUP],
    squaresize[XUP]/2,
    squaresize[XUP]*squaresize[YUP]/2,
    su3_vector_mpi_t,
    &field_neighbor_ddt[0][0][YUP]);

MPI_Type_vector(squaresize[YUP]
    *squaresize[ZUP]
    *squaresize[TUP]/2, 1,
    squaresize[XUP]/2,
    su3_vector_mpi_t,
    &field_neighbor_ddt[0][0][XUP]);
```

MECHANISM TO ENABLE OUT-OF-ORDER PACKET PROCESSING IN A DATATYPE ENGINE

STATEMENT OF GOVERNMENT-FUNDED RESEARCH

This invention was made with Government support under Contract Number H98230-23-C-0350 awarded by the Maryland Procurement Office. The Government has certain rights in this invention.

FIELD

User applications may send and receive data which resides in non-contiguous buffers. A typical flow may involve packing the data into a contiguous send buffer, transferring the data, and unpacking the data from a contiguous receive buffer into the appropriate application locations. These data copy operations (i.e., the pack and unpack) occur in software and are thus serialized with the data transfer communications, which can significantly extend the communication time. In a hardware solution, a network interface card (NIC) can incorporate a datatype engine which allows users to describe complex data layouts for sending and receiving data, including a multi-dimensional array with unique strides in each of the multiple dimensions. Adaptive routing may be used to optimize the overall throughput of a network. However, adaptive routing may result in out-of-order packets arriving across the network. The arrival of out-of-order packets may require a non-linear progression through the description of the datatype, which can be challenging or expensive given varyingly-sized dimensions of the multi-dimensional array or varyingly-sized elements which are sub-structures of a larger data structure.

BRIEF DESCRIPTION OF THE FIGURES

In the figures, like reference numerals refer to the same figure elements.

DETAILED DESCRIPTION

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

The described aspects provide a solution to the challenge of out-of-order packet processing in a datatype engine by precomputing a starting state or context for each packet and generating read or write requests based on the precomputed state or context. Out of order packet processing may be required in the case of a Put message which is transferred from an initiator node to a target node as a series of Put packets. Allowing the packets to be delivered out of order can be beneficial for performance. Out of order processing may also be required when transmitting or receiving a Get response message, transferred as a series of packets. In this case, a datatype at the target node may define how data is gathered from host memory to construct the overall Get response. A datatype at the initiator node may define a scatter operation, determining how data from the overall Get response is placed in initiator host memory. The initiator initially processes the Get message by sending a series of Get request packets to the target. At the target, the Get request packets may be received out of order, and the corresponding Get response packets are also constructed and transmitted out of order, and thus received out of order back at the initiator.

Current software interfaces may allow a user to express the data layout in its native form. One commonly used software interface is the Message Passing Interface (MPI), in which a user can provide a base address to start a transfer and a datatype to apply to that transfer. MPI also provides a mechanism called "derived datatypes," which can describe the data layout in host memory and use that description for certain MPI calls (e.g., MPI_Send and MPI_Recv). Historically, using derived datatypes in MPI can result in poor performance, because the library must interpret the description in order to perform copies in to and out of an internal buffer for the MPI_Send and the MPI_Recv commands, respectively. As a result, the pack and unpack operations are still performed in software and still serialized with the communications, which can result in inefficiencies in the overall performance of data-related operations, such as data gather/scatter operations.

In a hardware solution, a network interface card (NIC) can incorporate a datatype engine which allows users to describe complex data layouts for sending and receiving data, including a multi-dimensional array with unique strides in each of the multiple dimensions. The datatype engine can perform the above-described gather/scatter operations, which can eliminate the inefficient data copies used in the prior software solutions. The datatype engine can reside in the network interface card (NIC) or an application-specific integrated circuit (ASIC) of the NIC, including as part of an outbound packet engine and an inbound packet engine. The datatype engine can generate a series of addresses and lengths based on a datatype descriptor. The datatype descriptor can be an input/output vector (IOVEC) structure with relative addressing and can describe a multi-dimensional array defined with a count, a block size, and a stride. By using the datatype descriptor as part of the data path, the datatype engine in both the transmit path (e.g., handling read operations from host memory by the outbound packet engine) and the receive path (e.g., handling write operations to host memory by the inbound packet engine) can result in reducing the communication time involved with data transfer over a network. This can result in a more efficient transfer of messages between network entities, which can in turn result in a more efficient use of resources, e.g., to support high performance computing (HPC).

The described aspects of the datatype engine can perform gather/scatter operations while addressing several challenges. A first challenge is ensuring that the representation of a datatype covers common use cases while remaining compact. This may be difficult when dealing with codes which build arrays of structures. The described aspects can represent a datatype with three strides, three counts, and a representation of a base block. The system can represent the base block using a length, a valid number of bytes, and a bit mask to indicate which bytes are valid. This datatype can represent an arbitrary three-dimensional (3D) array of C structures (up to 256 bytes per structure) using less than 64 bytes of storage for each datatype.

A second challenge involves the use of redundant memory resources as part of compaction. Reading data from memory and placing the read data into a temporary local buffer before compacting the valid bytes may require redundant memory resources. The described aspects address this challenge by compressing 256 bytes with an arbitrary bit mask to capture only the valid bytes in only eight stages of 2 to 1 multiplexers. The system can further leverage the POPCNT instruction found in x86 processors to quickly and efficiently encode additional information to reduce the amount of logic needed for each stage of the compaction.

A third challenge (as described herein and below in relation to FIGS. 4-7) involves handling out-of-order packets. Because modern HPC networks can leverage adaptive routing to optimize the overall throughput, some packets may arrive out of order. The arrival of out-of-order packets may require a non-linear progression through the description of the datatype, which can be challenging or expensive given varyingly-sized dimensions of the multi-dimensional array or varyingly-sized elements which are sub-structures of a larger data structure. These out-of-order packets can be of three types: packets received as a "Put" (e.g., a write operation); request packets received as a "Get" (e.g., a read operation), for which a response must be produced; and packets received in response to a "Get." For Put operations, a first node may send data to a second node, and the data packets may arrive out of order at the second node. For Get operations, a first node can request data from a second node, and the request packets may be received (and responded to) out of order at the second node, and the data packets as part of the response may be received out of order at the first node.

To handle the Get operations at the initiator, aspects of the described datatype engine (DTE) can precompute the starting state or context for each packet as the Get requests are formed, e.g., an 8-byte context for each 4-Kilobyte (KB) packet. The system can store this starting state or context with the other information needed to handle the Get response, which allows the out-of-order response to use the stored state to initialize the DTE. To handle the Get operations at the target, software can precompute context per response packet, e.g., an 8-byte context for each 4-KB packet, when the datatype defining the gather operation is defined. This context can be stored in target host memory. The DTE at the target which is responsible for constructing Get response packets can be provided with information along with each Get request packet which allows it to read the proper context from host memory if necessary. The DTE at the target may also cache context when it finishes processing a Get response, which may be used for processing a subsequent Get response of the same overall Get.

To handle the Put operations, the receiving side can provide the datatype for receiving the Put operation. The software associated with the system (e.g., the NIC ASIC) can precompute a small amount of DTE state or context (e.g., 8 bytes) corresponding to the start of each packet. To process an out-of-order packet, the system can combine a lookup from host memory with the datatype descriptor. The system can further optimize the target or destination of the Put operation to reuse the state in the DTE from one packet to the next packet. Even when using adaptive routing, packets may arrive mostly in order. Reusing or holding the state in the DTE can eliminate the host memory lookup. Precomputing, caching, and retrieving the context for packets as well as initializing the datatype engine to handle out-of-order packets is described below in relation to FIGS. 4-7.

In addition to addressing these challenges to improve the performance of data transfers across a network and to support high performance computing, the described system can include other aspects. One aspect can involve the ordering of datatype commands (e.g., installing a datatype descriptor in a DTE of a NIC) relative to payload commands (e.g., performing a user read/write command). A datatype must be created and setup or installed prior to being used by a payload or user command. Commands may travel through the NIC via multiple paths, e.g., based on a series of parallel queues. The system can select the queue by performing a hash of various fields in a command or associated packet. As a result, both the command to install a datatype descriptor into the DTE of the NIC and the user command can have a flow hash which enables the two commands to take the same path. Furthermore, the system can include an event which indicates that a datatype command has completed, as shown in the communications with the event engine depicted below in relation to FIG. 1. Once the datatype command has completed, the installed datatype descriptor can be used by many independent subsequent commands.

Another aspect of the described system can involve datatype selection and storage efficiency. A command to begin a new message must indicate the datatype that it wishes to use. However, including a full datatype descriptor with each command may not be efficient or practical. In addition, datatypes may be frequently structured the same between processes on a given node which are part of the same user job. The described aspects can include an allocation mechanism for datatypes which can result in improving the storage efficiency as well as the efficiency of new message commands. The software, e.g., the operating system (OS), can allocate datatype storage space and provide a datatype key to the user. The system may use a single key space for datatype descriptors, which single key space can be shared between processes. The hardware can provide an enforcement mechanism which ensures that only processes that are part of the same application can use a given key. The user can include the given key in a new message to specify which datatype to use. The system can use a null entry for the datatype key to indicate that a command or transfer does not include a datatype.

Yet another aspect of the described system can relate to the use of both absolute and relative addressing in the IOVEC structure used by the datatype engine. Prior solutions can use absolute addressing in a gather/scatter list to support use cases involving the OS kernel-mode. However, the interface for user level software generally uses relative addressing, which can create limitations when using gather/scatter engines by the MPI. In using the IOVEC structure in the described aspects, the DTE can retrieve data from host memory based on a list of addresses and lengths using two different modes of addressing. The first mode is absolute addressing, in which the addresses retrieved from host memory are the virtual addresses to be used, i.e., using a set of absolute address/length pairs in an IOVEC. The second mode is relative addressing, in which the addresses retrieved from host memory are used as offsets from the base virtual address provided by the user in a new message, where the offset can be obtained from an IOVEC (list of offsets and lengths) or from a datatype descriptor.

Another aspect of the described system involves the efficiency of datatype storage, IOVECs, and commands. In order to start a new message, prior solutions can add a pointer to an IOVEC to each command, which can result in increasing the size of the command and decreasing the efficiency of the command interface. The system can encode and setup or install IOVECs in the same way as other datatypes. However, some IOVEC use cases may be used only once, i.e., the system creates the IOVEC, uses it for one command ("use once"), and discards it. Because the command ordering works in collaboration with the IOVEC approach, the command ordering logic described above can allow the system to maintain existing command formats while still ensuring an efficient setup path for these "use once" IOVECs.

Thus, aspects of the described system can address the above-described challenges by providing a datatype engine (DTE) which generates a series of addresses and lengths based on a datatype descriptor. The datatype descriptor can represent a multi-dimensional array defined with a count, a block size, and a stride, as described below in relation to FIG. 2. The datatype descriptor can also reference an IOVEC structure with relative addressing. An overall architecture of a system (e.g., a NIC) which includes an outbound transfer engine and an inbound transfer engine is described below in relation to FIG. 1, while a detailed diagram of an outbound transfer engine with a DTE module in communication with other modules is described below in relation to FIG. 3.

Furthermore, aspects of the described system can address the out-of-order packet processing challenges by precomputing, for each packet, a small (e.g., 8-byte) state or context for each packet to initialize the DTE and further by caching the precomputed context for subsequent retrieval or use, which can facilitate out-of-order packet processing. A diagram of an inbound transfer engine (IXE) is described below in relation to FIG. 4, and a DTE module of an IXE which facilitate out-of-order packet processing is described below in relation to FIG. 5.

Exemplary High-Level Architecture

Figure 1:
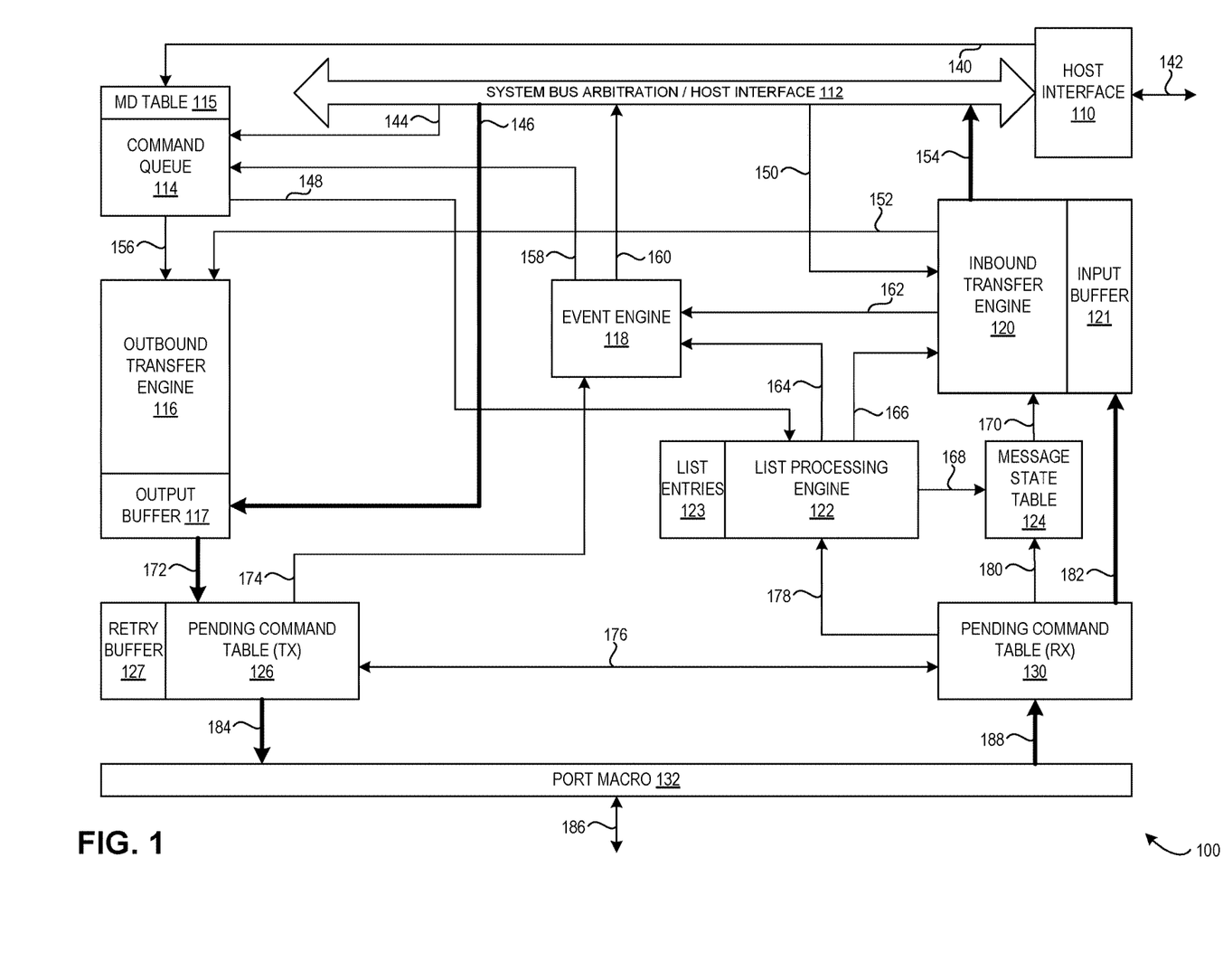
FIG. 1 illustrates a diagram of an architecture which facilitates a datatype engine to support high performance computing, in accordance with an aspect of the present application.

FIG. 1 illustrates a diagram of an architecture which facilitates a datatype engine to support high performance computing, in accordance with an aspect of the present application. The diagram of FIG. 1 can depict a network interface card (NIC) 100, which includes various components or modules, as well as interfaces and communications. On one end of NIC 100, a host interface 110 exists between components of NIC 100 and a host. Host interface 110 can handle communications with the host (via a communication 142). On the other end of NIC 100, a port macro 132 exists between the NIC components and a network, and can handle communications with the network (via a communication 186). In general, components on the left side of diagram 100 pertain to an outbound path and can process transmit operations related to performing read operations from host memory (indicated by the bold-lined communications of 146, 172, and 184, described below), while components on the right side of diagram 100 pertain to an inbound path and can process receive operations related to performing write operations to host memory (indicated by the bold-lined communications of 188, 182, and 154).

Host interface 110 can receive data from the various NIC components via a system bus arbitration/host interface 112. Host interface 110 can also send a command list pointer or a command with data to a command queue 114 (via a communication 140), which can include a metadata (MD) table 115. Command queue 114 can send portal and Ethernet operations (e.g., relating to read operations in the transmit path) to an outbound transfer engine 116 (via a communication 156), which can include an outbound buffer 117 for storing data relating to operations performed by outbound transfer engine 116. Command queue 114 can also receive commands related to reading data, e.g., a direct memory access (DMA) fetch command (via a communication 144) as well as events from an event engine 118 (via a communication 158). Command queue 114 can also transmit append commands to a list processing engine 122 (via a communication 148).

Outbound transfer engine 116 can include an instance of a datatype engine (not shown in FIG. 1) and can perform various operations to generate requests or commands relating to read DMA operations. Outbound transfer engine 116 can receive outbound DMA data from host memory (via a communication 146 from host interface 112), which data can be stored in output buffer 117. A detailed description of outbound transfer engine 116 is provided below in relation to FIG. 3.

Subsequent to the datatype engine of outbound transfer engine 116 using an IOVEC with relative addressing and describing a multi-dimensional array in the manner described herein, outbound transfer engine 116 can output the requests or commands to a pending command table (transmit (TX)) 126 (via a communication 172). Pending command table 126 can include a retry buffer 127. Pending command table 126 can send a completion notification to event engine 118 (via a communication 174) upon completing a respective command. Pending command table 126 can transmit outbound packets corresponding to read commands (via a communication 184 to port macro 132).

NIC 100 can receive inbound packets to be written to host memory (via a communication 188). The inbound packets can be transmitted to a pending command table (receive (RX)) 130. Pending command table 130 can subsequently send information to a message state table 124 (via a communication 180) and a message to list processing engine 122 (via a communication 178), which can include list entries 123. List processing engine 122 can send information to message state table 124 (via a communication 168), which can send information to an inbound transfer engine 120 (via a communication 170). Inbound transfer engine 120 can include an input buffer 121. List processing engine 122 can also send a memory or datatype descriptor to inbound transfer engine 120 (via a communication 166) to be stored in a datatype engine (not shown) of inbound transfer engine 120. List processing engine 122 can further send events to event engine 118 (via a communication 164). Pending command table 130 can also transmit to inbound transfer engine 120 a payload associated with the inbound packets (via a communication 182), which payload can be stored in input buffer 121. Inbound transfer engine 120 can include an instance of a datatype engine (not shown in FIG. 1) and can perform various operations to generate requests or commands relating to write DMA operations. Subsequent to the datatype engine of inbound transfer engine 120 using an IOVEC with relative addressing and describing a multi-dimensional array in the manner described herein, inbound transfer engine 120 can transmit inbound DMA data to host memory (via a communication 154 to host interface 112).

Inbound transfer engine 120 can receive data from host interface 112 (via a communication 150) and can also send a completion notification to event engine 118 (via a communication 162) upon completing a respective command. In addition to receiving completions from pending command table 126 and inbound transfer engine 120 (via, respectively, communications 174 and 162), event engine 118 can send event-related information to host interface 112 (via a communication 160). The pending command tables in the transmit and receive paths can communicate a response state (tables 126 and 130 via a communication 176), and inbound transfer engine 120 can also transmit replies to outbound transfer engine 116 (via a communication 152). In the same way that outbound transfer engine 116 can form a packet and that the DTE of outbound transfer engine 116 can form a plurality of reads, list processing engine 122 can form an address for writing a packet and pass that address to the DTE of inbound transfer engine 120. The DTE of inbound transfer engine 120 can form a plurality of write requests comprising offsets from that address and corresponding lengths based on a given datatype descriptor. It would be obvious to anyone skilled in the practice of the art that this mechanism could be employed on the input processing of a packet as well.

Overview of Datatype Descriptors

In a typical NIC implementation, user software can supply a command which indicates a virtual address and a length of data to be transferred. The NIC can receive the command and translate the virtual address. Subsequently, the NIC can issue reads to the host memory (for transmitting data, e.g., in a Put operation at the initiator) or writes to the host memory (for receiving data, e.g., in a Put operation at the target). In conventional solutions, these issued reads and writes to the host memory are generally for large blocks of contiguous data.

The described aspects provide a datatype engine which generates a series of addresses and lengths based on a datatype or a "datatype descriptor." Datatypes can natively express data layouts in application memory, which can result in eliminating the resource-consuming copies. That is, a datatype is a way to describe the native data layout in memory. Without a datatype engine as described herein, central processing units (CPUs), general processing units (GPUs), and advanced memory systems are used to perform the described data copies. However, because operations using these systems can be expensive (i.e., in general, CPUs, GPUs, and advanced memory systems are better suited for other work), using these systems may be inefficient.

One example of a datatype descriptor form can be a multi-dimensional array descriptor, in which the datatype engine uses parameters to describe an array in host memory, as described below in relation to the matrix transpose example of FIG. 2. The multi-dimensional array can include: a number of elements in each dimension; a size of a block to be transferred; and a stride in each dimension. The datatype descriptor can also include a handle to the old datatype name and the new datatype name, as described below in relation to FIGS. 2 and 4. Another example of a datatype descriptor form can be an input/output (I/O) vector (IOVEC), in which the DTE retrieves a list of addresses from host memory. The IOVEC may use either relative addressing or absolute addressing. In relative addressing, the DTE can retrieve data based on addresses which are "offsets" from a base virtual address provided by a user, while in absolute addressing, the DTE can retrieve data based on addresses which are the virtual addresses to be used.

Exemplary Code for Application Using Datatypes

Figure 2:
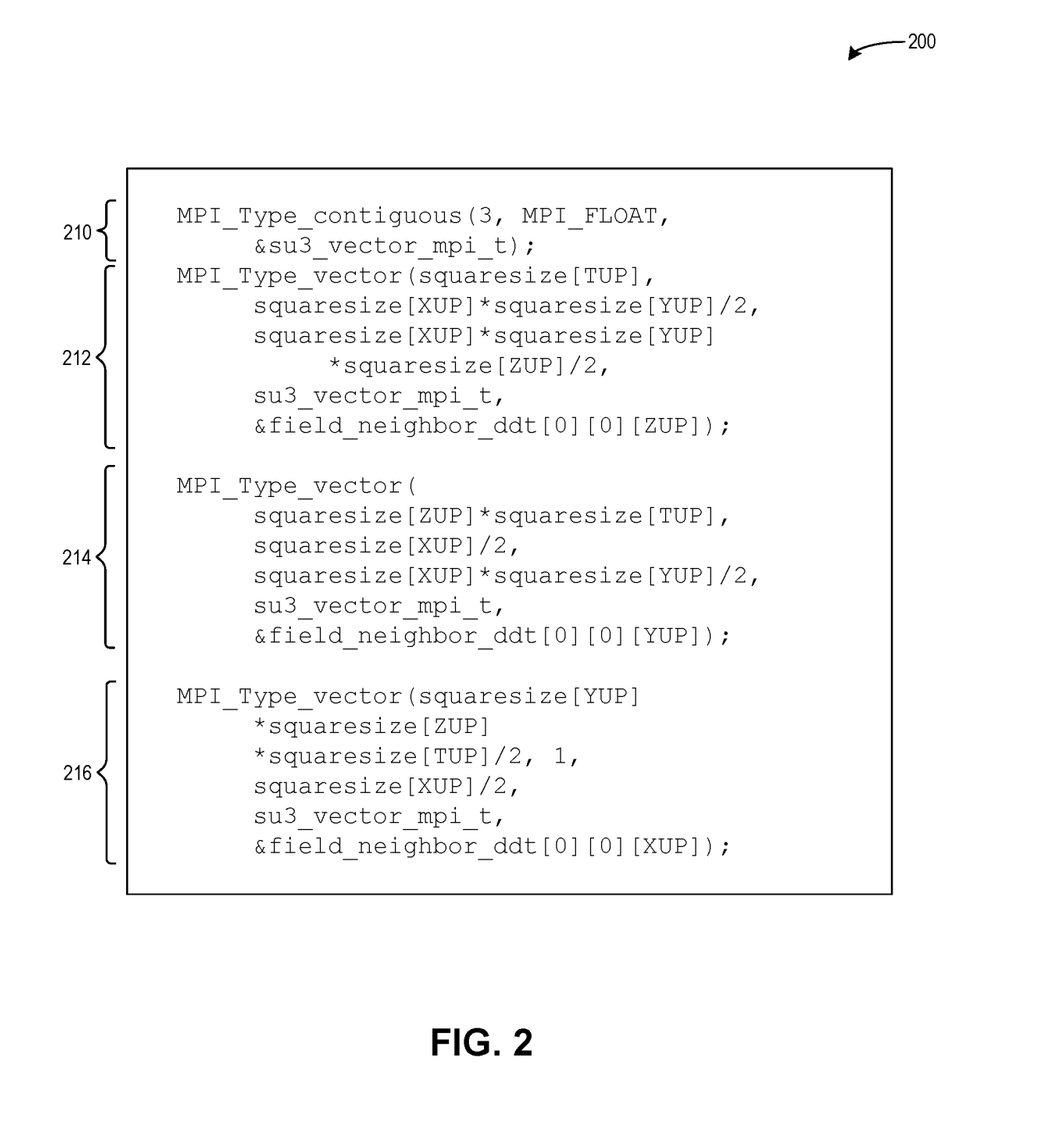
FIG. 2 illustrates an exemplary code excerpt for an application using datatypes, in accordance with an aspect of the present application.

FIG. 2 illustrates an exemplary code excerpt 200 for an application using datatypes, in accordance with an aspect of the present application. A section 210 can indicate a datatype "MPI_Type_contiguous" which allows replication of a datatype into contiguous locations. Sections 212, 214, and 216 can indicate a datatype "MPI_Type_vector" which allows replication of a datatype into locations with equally spaced blocks, where each block can be obtained by concatenating the same number of copies of the old datatype. The space between the blocks can be a multiple of the extent of the old datatype. The "MPI_Type_vector" can indicate a structure comprising a multi-dimensional array which includes: a count corresponding to a number of blocks or elements in each dimension; a block size or length corresponding to a number of elements in each block; a stride in each dimension, corresponding to a number of elements between the start of each block; an indicator of an existing or an old datatype; and a handle to a new datatype.

Section 210 can create a three-element vector of floats and be used to construct descriptions of multiple faces (e.g., three) of a matrix. Using the datatype indicated in sections 214 and 216 can result in transmitting data in large chunks or many large chunks, which chunks can be aggregated up to a message and can result in an efficient transfer. However, using the datatype indicated in section 212 can result in performing a gather/scatter of 12 bytes from many locations, which may not be as efficient as using the datatype of sections 214 and 216. In comparing the NIC performance against the performance of CPUs and GPUs, the datatype engine in the NIC with datatype descriptors can perform more efficiently when transferring data in larger chunks (e.g., 128-byte segments) rather than in smaller chunks (e.g., 8-byte or 12-byte segments).

Outbound Packet Engine and the Transmit Path

Figure 3:
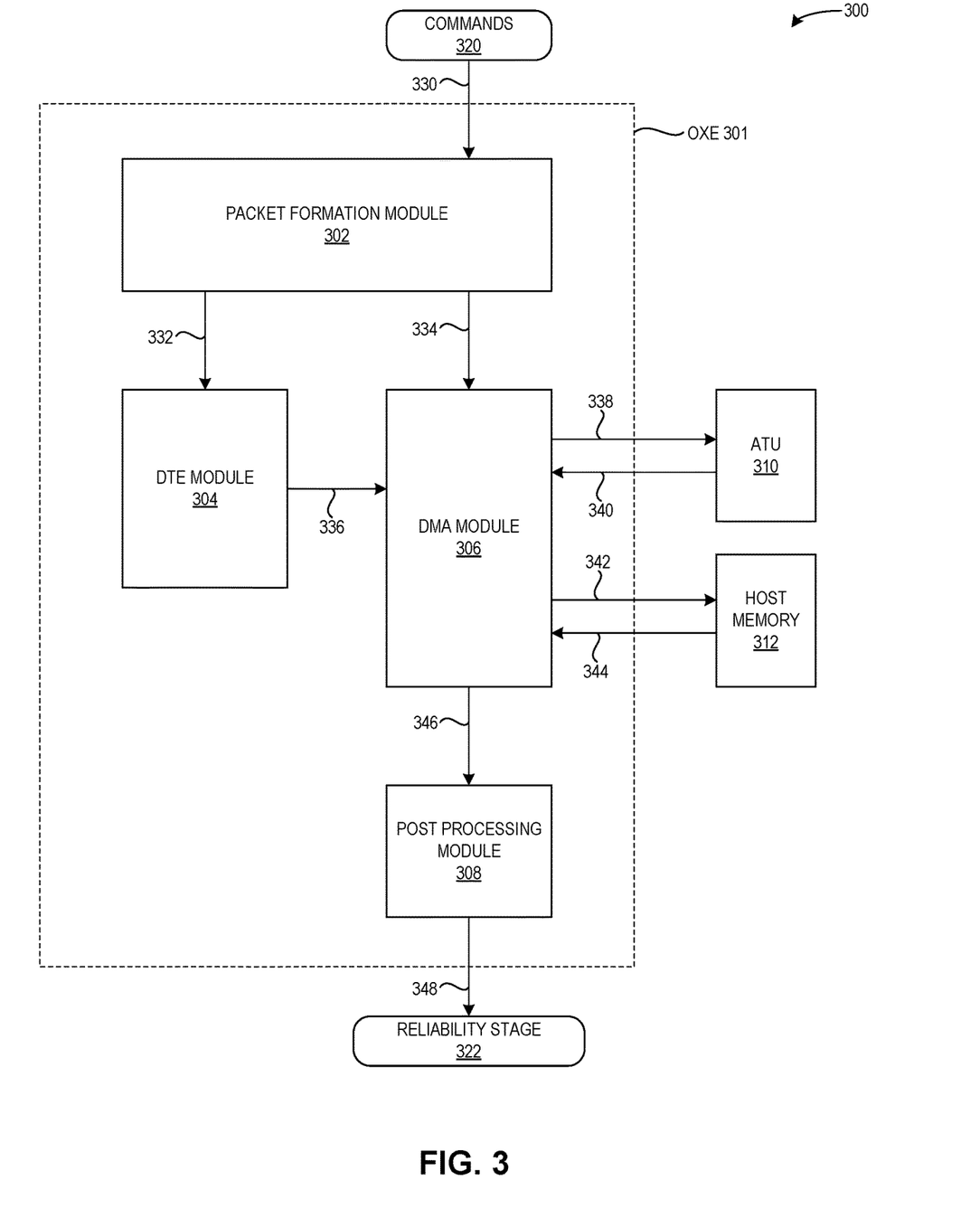
FIG. 3 illustrates a diagram of an outbound packet engine (OXE) with a datatype engine as part of the transmit path, in accordance with an aspect of the present application.

As described above in relation to FIG. 1, the datatype engine can be integrated with both the transmit and the receive logic in, respectively, the outbound packet engine and the inbound packet engine. FIG. 3 illustrates a diagram 300 of an outbound packet engine 301 with a datatype engine as part of the transmit path, in accordance with an aspect of the present application. Outbound packet engine (OXE) 301 can include: a packet formation module 302; a datatype engine (DTE) module 304; a direct memory access (DMA) module 306; and a post processing module 308. OXE 301 can take as input data from commands 320 and can output data packets to a reliability stage 322. In addition, OXE 301 can communicate with an address translation unit (ATU) 310 and a host memory 312.

During operation, OXE 301 can receive a command, e.g., from a command queue of commands 320 (via a communication 330). The command can be received via a message passing interface (MPI) and can be a command to read data from a host memory. In a standard path (i.e., where the datatype descriptor is not present and thus bypassing the DTE), packet formation module 302 can form a DMA instruction which indicates a header, an address, and a length associated with the data to be read from the host memory, referred to as a "non-DTE DMA instruction." This standard non-DTE DMA instruction can be sent to DMA module 306 (via a communication 334). DMA module 306 can retrieve the corresponding address translations from ATU 310, e.g., by sending a virtual address 338 to ATU 310 and receiving a physical address 340 from ATU 310. DMA module 306 can subsequently issue one or more read requests to host memory 312 (via a communication 342) and receive the corresponding one or more read responses from host memory 312 (via a communication 344). DMA module 306 can transmit the read responses to post processing module 308 (via a communication 346), which processed data can be transmitted as output to reliability stage 322 (via a communication 348).

In the case where the datatype descriptor is present (e.g., indicated as a handle to a previously stored datatype descriptor) in the command, packet formation module 302 can form a DMA instruction which indicates or references the datatype descriptor as well as a base address and a length associated with the data to be read from the host memory, referred to as a "DTE instruction." This DTE instruction can be sent to DTE module 304 (via a communication 332). DTE module 304 can identify or determine that the datatype descriptor indicated in the DTE instruction matches a datatype descriptor stored in DTE module 304, e.g., as previously configured and stored by a user. Using the identified matching datatype descriptor, DTE module 304 can generate a plurality of DMA read instructions with offsets from the base address and corresponding lengths. DTE module 304 can subsequently transmit these generated DMA read instructions to DMA module 306 (via a communication 336). DMA module 306 can convert the DMA read instructions to read requests and perform the address translation (if needed) and the read retrieval operations described above in relation to communications 338, 340, 342, and 344 as well as the subsequent operations relating to post processing module 308 and reliability stage 322.

Figure 4:
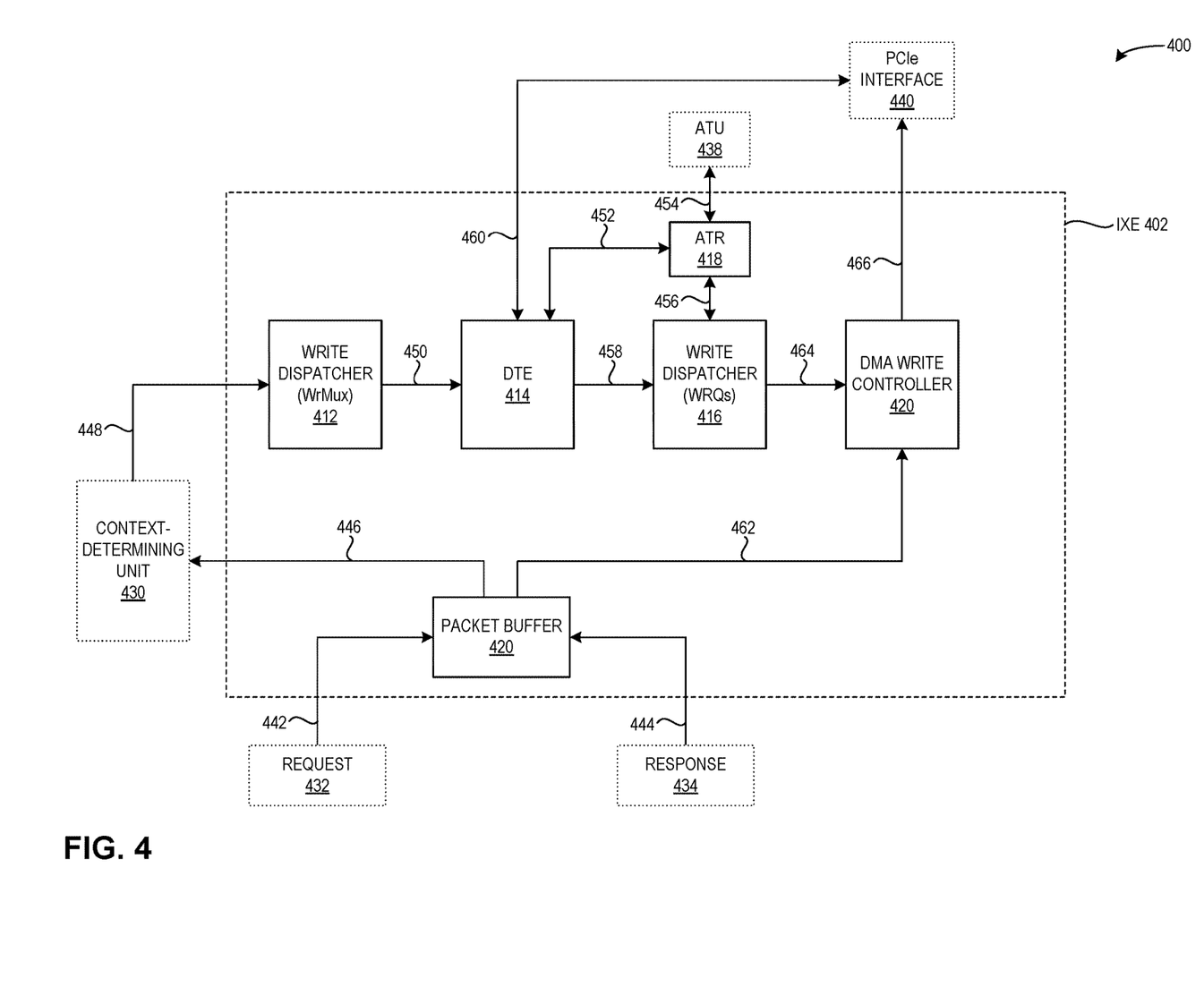
FIG. 4 illustrates a diagram of an inbound transfer engine (IXE) which facilitates out-of-order packet processing, in accordance with an aspect of the present application.

Exemplary IXE and DTE of IXE: Using Precomputed and Cached Context to Facilitate Out-of-Order Packet Processing by the Datatype Engine FIG. 4 illustrates a diagram 400 of an inbound transfer engine (IXE) 402 which facilitates out-of-order packet processing, in accordance with an aspect of the present application. A request 432 or a response 434 can be received by IXE 402 (via, respectively, communications 442 and 444). Diagram 400 focuses on the request path. Packet buffer 420 can receive the request (after the necessary decoding of the request, not shown) via communication 442. Packet buffer 420 can send the necessary information to context-determining unit 430, e.g., for a respective packet of the request or message (via a communication 446). The respective packet can be associated with a datatype descriptor stored in a datatype engine of the NIC. Context-determining unit 430 can determine whether the respective packet is associated with a message which has already been received or is associated with a new message. Based on this determination, context-determining unit 430 can generate, for the respective packet, a datatype handle corresponding to the datatype descriptor and an offset indicating a position of the respective packet within the plurality of packets. Context-determining unit 430 can transmit the generated datatype handle and offset to a write dispatcher or write multiplexer (WrMux) 412 of IXE 402 (via a communication 448). Write dispatcher 412 can transmit the generated datatype handle and offset as DMA write instructions to a datatype engine (DTE) 414 (via a communication 450). DTE 414 can determine whether a context for the respective datatype handle and offset is cached. If the context is cached, DTE 414 can initialize based on the cached context and can further generate a plurality of DMA write instructions comprising addresses and lengths.

DTE 414 can output the generated plurality of DMA write instructions to a write dispatcher (Write Request Queues (WRQs)) 416 which can convert the DMA instructions to a plurality of write requests, e.g., by obtaining addresses as needed from an address translation unit (ATU) 438 via an address translator (ATR) 418 of IXE 402 (via, respectively, communications 454 and 456). Write dispatcher 416 can transmit the plurality of write requests to a direct memory access (DMA) write controller 420 (via a communication 464), which in turn can transmit the requests to a host memory via, e.g., a Peripheral Component Interconnect express (PCIe) interface 440 (via a communication 466).

If the context is not cached, DTE 414 can retrieve the context from host memory, which can include obtaining the appropriate address information from ATU 438 via ATR 418 of IXE 402 (via, respectively, communications 454 and 452). After obtaining the appropriate address information, DTE 414 can retrieve the context by transmitting a request to and receiving a response from the host memory via PCIe interface 440 (via a communication 460).

Figure 5:
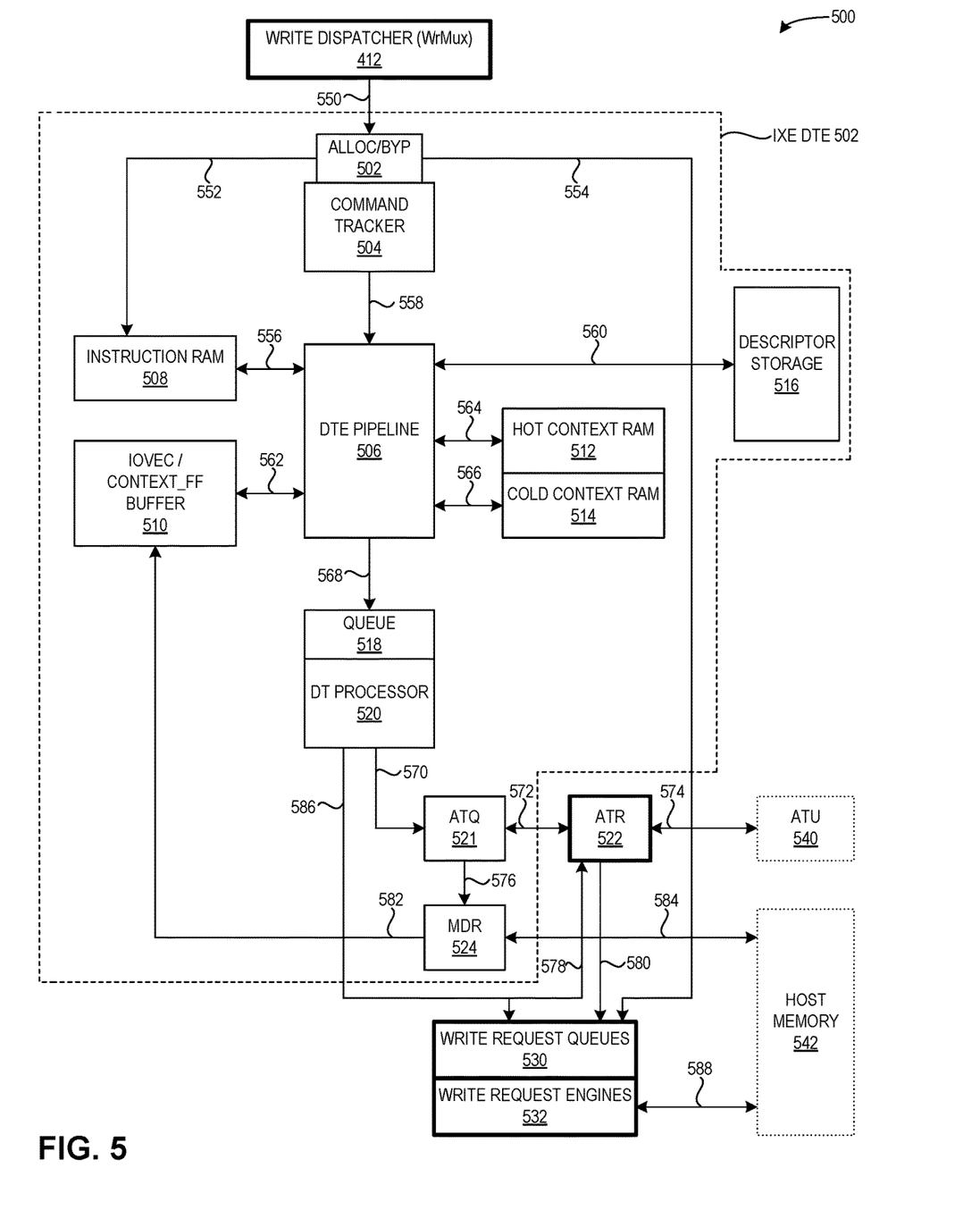
FIG. 5 illustrates a diagram of an inbound transfer engine (IXE), including a datatype engine, which facilitates out-of-order packet processing, in accordance with an aspect of the present application.

FIG. 5 illustrates a diagram 500 of an inbound transfer engine (IXE), including an IXE datatype engine 502 which facilitates out-of-order packet processing, in accordance with an aspect of the present application. The IXE can include IXE DTE 502 (indicated by the dashed line border) as well as: write dispatcher (WrMux) 412; an ATR 522; write request queues 530; and write request engines 532 (indicated by the bolded line borders). IXE 502 can communicate with an ATU 540 and a host memory 542, which are not part of the IXE or IXE DTE 502 (as indicated by the dotted line borders). Host memory 542 can represent a PCIe arbitrator (or PARB) which communicates with host memory.

During operation, write dispatcher 412 can transmit a packet with a DTE handle and offset to IXE DTE 502 (via a communication 550), which is received by an allocation/bypass unit 502. If a datatype handle is not indicated in the received packet (e.g., is indicated as "none"), allocation/bypass unit 502 can send the packet directly to write request queues 530 for immediate processing (via a communication 554), as described above in relation to communication 334 of FIG. 3. If a datatype handle is indicated in the received packet, allocation/bypass unit 502 can allocate the packet in an instruction RAM 508 (via a communication 552) and indicate the command in a command tracker 504. Command tracker 504 can track received commands and can transmit the packet to a DTE pipeline unit 506 (via a communication 558), which can be responsible for gathering the information in order to process the packet. DTE pipeline 506 can determine whether a prior packet of a same message has been recently received or if the context for the packet has been cached.

Based on the datatype handle, DTE pipeline 506 can read the corresponding datatype from a descriptor storage 516 (via a communication 560). Descriptor storage 516 can include both non-byte mask descriptor storage and byte-mask descriptor storage. The byte-mask portion of a descriptor can refer to a value with a number of bits that can be used as a byte-mask on data of up to a predetermined number of bytes. For example, during a compaction process, each bit in an X-byte-mask can correspond to a byte in a X-byte chunk or block of data. The non-byte-mask portion of a descriptor can include other information such as loop counts and strides (for a derived datatype) or a pointer to an IOVEC in host memory (for an IOVEC datatype), etc. which is created by a user and stored in descriptor storage 516 for subsequent use or retrieval by the DTE.

If the context is cached, DTE pipeline 506 can retrieve the context from one of a hot context random access memory (RAM) 512 or a cold context RAM 514 (via, respectively, communications 564 and 566). In general, hot context RAM 512 can store context temporarily during processing of a packet. Cold context RAM 514 can store context when processing of a packet is complete, which may be used to begin processing a subsequent packet of the same overall message. For example, DTE pipeline 506 can obtain a current value for each dimension of a multi-dimensional array (e.g., the current loop value) and the start location of the respective packet within a block of the host memory. DTE pipeline 506 can then begin processing the packet immediately. DTE pipeline 506 can use the context retrieved from the cache to initialize the state for the packet and can further send the packet to a queue 518 (via a communication 568) to be worked on by a datatype (DT) processor 520. DT processor 520 can generate, based on the precomputed and cached context, the multiple instructions, e.g., the plurality of write requests comprising addresses and lengths.

If the context is not cached, DTE pipeline 506 can retrieve the context from host memory using the obtained datatype descriptor. The DMA instruction, and information from the descriptor, travels to DT processor 520 via queue 518 (via communication 568). In contrast to the usual processing (i.e., generating DMA writes), this generates a DMA read transaction to fetch the context from host memory.

DT processor 520 can obtain the appropriate address information from ATU 540 via ATR 522 and an address translation queue (ATQ) 421 (via, respectively, communications 574 and 572). After obtaining the appropriate address information, DTE pipeline 506 can retrieve the context from host memory 542 via a memory data read (MDR) 524 (via, e.g., communications 576 and 584). MDR 524 can transmit the obtained context information (including the current loop counter values) to an IOVEC/Context_Fast Forward (FF) buffer (ICB) 510 (via a communication 582). For example, given a three-dimensional array of dimensions [X, Y, Z], the obtained context can be a derived datatype fast-forward entry and can comprise 8 bytes (ordered from bits 63:0), which can include: unused bits (bits 63:56); a current byte location with a block (bits 55:48); a current element in the Z dimension (bits 47:32); a current element in the Y dimension (bits 31:16); and a current element in the X dimension (bits 15:0).

When ICB 510 receives this information, command tracker 504 can manage sending the waiting instruction to DTE pipeline 506 (via communications 556 and 558). DTE pipeline 506 can read the obtained context directly from ICB 510 (via a communication 562) and begin processing the packet, as described above, i.e., by using the context retrieved from ICB 510 to initialize the state for the packet and sending the packet to queue 518 to be worked on by DT processor 520, where DT processor 520 can generate the multiple instructions.

When DT processor 520 has generated the multiple instructions comprising addresses and lengths (whether using the cached context or the obtained context from host memory), DT processor 520 can transmit, via a communication 586, the multiple instructions to write request queues 530 (which correspond to write dispatcher (WRQs) 416 of FIG. 4). Write request queues 530 may also obtain information related to address and packet information via communications 570, 572, 574, 576, 578, 580, and 586. Write request engines 532 can transmit the multiple instructions (i.e., write requests) to host memory 542 and receive the appropriate response (via a communication 588).

Method for Facilitating Out-of-Order Packet Processing in a Datatype Engine

Figure 6:
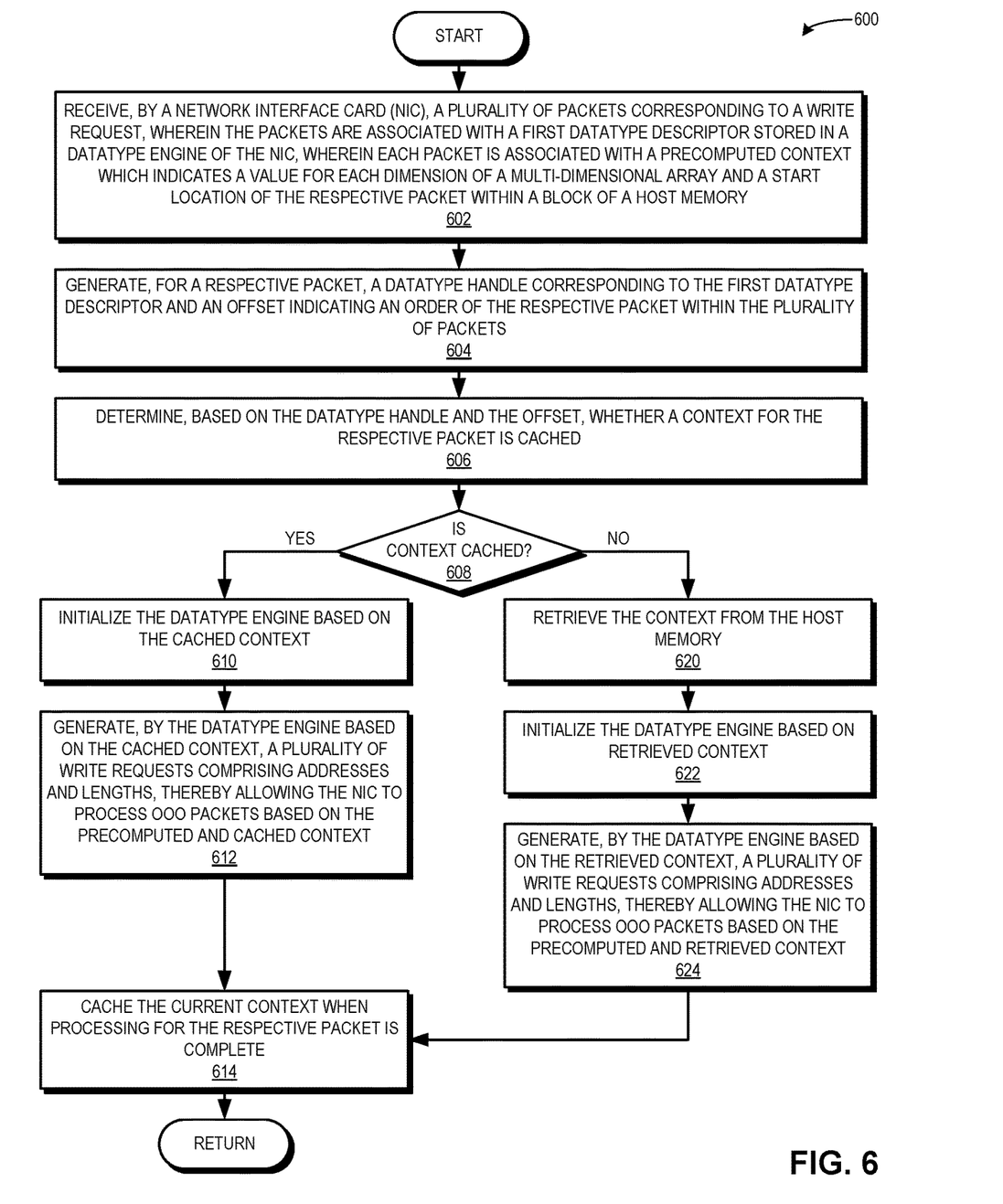
FIG. 6 presents a flowchart illustrating a method which facilitates out-of-order packet processing in a datatype engine, in accordance with an aspect of the present application.

FIG. 6 presents a flowchart 600 illustrating a method (in a system) which facilitates out-of-order packet processing in a datatype engine, in accordance with an aspect of the present application and as described above in relation to FIGS. 4 and 5. During operation, the system receives, by a network interface card (NIC), a plurality of packets corresponding to a write request, wherein the packets are associated with a datatype descriptor stored in a datatype engine of the NIC, wherein each packet is associated with a precomputed context which indicates a value for each dimension of a multi-dimensional array and a start location of the respective packet within a block of a host memory (operation 602, as described above in relation to request 432 and communication 442 of FIG. 4). The system generates, for a respective packet, a datatype handle corresponding to the datatype descriptor and an offset indicating a position of the respective packet within the plurality of packets (operation 604, as described above in relation to context-determining unit 430 of FIG. 4). The system determines, based on the datatype handle and the offset, whether a context for the respective packet is cached (operation 606). If the context is cached (decision 608), the system initializes the datatype engine based on the cached context (operation 610). The system generates, by the datatype engine based on the precomputed and cached context, a plurality of write requests comprising addresses and lengths, thereby allowing the NIC to process out-of-order (OOO) packets based on the precomputed and cached context (operation 612, as described above in relation to DTE 414 of FIG. 4 and DT processor 520 of FIG. 5). The system caches the current context when processing for the respective packet is complete (operation 614). The operation returns.

If the context is not cached (decision 608), the system retrieves the context from the host memory (operation 620). The system initializes the datatype engine based on the retrieved context (operation 622). The system generates, by the datatype engine based on the retrieved context, a plurality of write requests comprising addresses and lengths, thereby allowing the NIC to process out-of-order (OOO) packets based on the precomputed and retrieved context (operation 624, as described above in relation to DTE 414 of FIG. 4 and DT processor 520 of FIG. 5). The system caches the current context when processing for the respective packet is complete (operation 614). The operation returns.

Flowchart 600 depicts a method for processing a write request (e.g., a Put operation at the target by the DTE of an inbound transfer engine). As described herein, a similar method can be used for processing a read request (e.g., a Get operation at the target by the DTE of an outbound transfer engine). The main difference is that where the IXE DTE generates write instructions to write to host memory, the OXE DTE generates read instructions to read from host memory. Therefore, in flowchart 600, the received packets can correspond to a read request (e.g., similar to operation 602), and the DTE can generate, based on the precomputed and cached context, a plurality of read requests comprising addresses and lengths (e.g., similar to operations 612 and 624), which read requests are sent to a DMA module to be read or retrieved from host memory (as described above in relation to FIG. 3).

Figure 7:
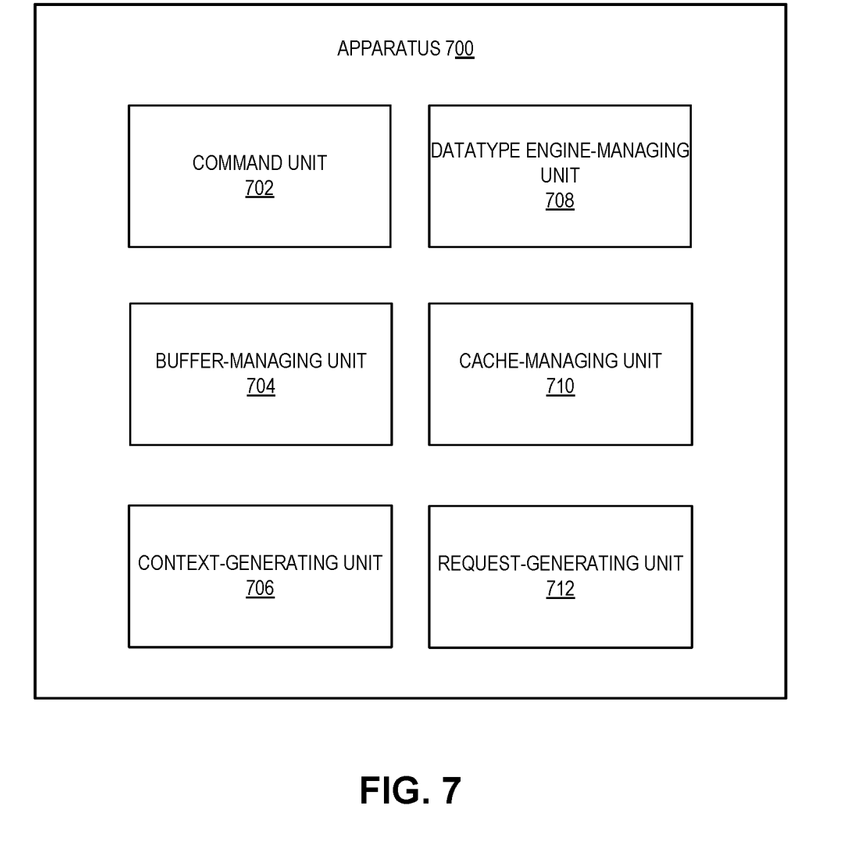
FIG. 7 illustrates an apparatus which facilitates out-of-order packet processing in a datatype engine, in accordance with an aspect of the present application.

Apparatus which Facilitates a Datatype Engine to Support High Performance Computing FIG. 7 illustrates an apparatus 700 which facilitates out-of-order packet processing in a datatype engine, in accordance with an aspect of the present application. Apparatus 700 can represent a network interface card (NIC) and can include: a command unit 702 to receive a command to write data to a host memory and to determine whether the command indicates a datatype descriptor stored in a datatype engine of the NIC; a buffer-managing unit 704 to store the incoming packet and information related to the corresponding instruction; a context-generating unit 706 to generate, for a respective packet, a datatype handle corresponding to the datatype descriptor and an offset indicating a position of the respective packet within the plurality of packets; a datatype engine-managing unit 708 to determine, based on the datatype handle and the offset, whether a context for the respective packet is cached and further to initialize the datatype engine based on a precomputed cached or obtained context and further to obtain the context from host memory if the context is not found in the cache; a cache-managing unit 710 to store precomputed contexts, for up to a predetermined number of messages; and a request-generating unit 712 to generate, based on the precomputed cached or obtained context, a plurality of write requests comprising addresses and lengths, thereby allowing the NIC to process out-of-order packets based on the precomputed cached or obtained context.

Command unit 702 can correspond to, e.g., command tracker 504 of FIG. 5. Buffer-managing unit 704 can correspond to, e.g., packet buffer 420 of FIG. 4. Context-generating unit 706 can correspond to, e.g., context-determining unit 430 of FIG. 4. Datatype engine-managing unit 708 can correspond to DTE 414 of FIG. 4 and IXE DTE 502 of FIG. 5. Cache-managing unit 710 can correspond to hot context RAM 512 and cold context RAM 514 of FIG. 5. Request-generating unit 712 can correspond to DT processor 520 of FIG. 5. The units described as part of apparatus 700 may perform the operations described above in relation to FIGS. 1, 4, 5, and 6.

In general, the disclosed aspects provide a system, method, apparatus, and non-transitory storage medium for facilitating out-of-order packet processing in a datatype engine. In one aspect, the system receives, by a network interface card (NIC), a plurality of packets corresponding to a read request or a write request, wherein the packets are associated with a datatype descriptor stored in a datatype engine of the NIC, wherein each packet is associated with a precomputed context which indicates a value for each dimension of a multi-dimensional array and a start location of the respective packet within a block of a host memory (e.g., as described above in relation to request 432 and communication 442 of FIG. 4). The system generates, for a respective packet, a datatype handle corresponding to the datatype descriptor and an offset indicating a position of the respective packet within the plurality of packets (e.g., as described above in relation to context-determining unit 430 of FIG. 4). The system determines, based on the datatype handle and the offset, that a context for the respective packet is cached. The system initializes the datatype engine based on the cached context. The system generates, by the datatype engine based on the precomputed and cached context, a plurality of read requests or write requests comprising addresses and lengths (e.g., as described above in relation to DTE 414 of FIG. 4 and DT processor 520 of FIG. 5), thereby allowing the NIC to process out-of-order packets based on the precomputed and cached context. The system caches the current context when processing for the respective packet is complete.

In a variation on this aspect, responsive to determining that the context for the respective packet is not cached, the system: retrieves the context from the host memory; caches the retrieved context; initializes the datatype engine based on the retrieved context; and generates the plurality of write requests comprising addresses and lengths based on the retrieved context. The system caches the current context when processing for the respective packet is complete.

In a further variation on this aspect, the system determines whether the respective packet is associated with a message which has already been received or is associated with a new message. The system generates the offset based on whether the packet is associated with the message which has already been received or is associated with the new message.

In a further variation, generating the offset is further based on information in the respective packet.

In a further variation, the datatype descriptor comprises at least one of: a representation of a multi-dimensional array; and a reference to an input/output vector (IOVEC) which indicates addresses and lengths of data to be read from or written to the host memory. The representation of the multi-dimensional array includes: a number of elements in each dimension; a size of a block to be transferred; and a stride in each dimension.

In a further variation, the respective packet is received out-of-order within the plurality of packets, and initializing the datatype engine based on the cached context causes the out-of-order packet to be processed correctly based on the generated datatype handle and offset.

In a further variation, a respective context for a predetermined number of messages can be cached at one time.

In a further variation, the precomputed context is stored in the host memory.

Another aspect provides a non-transitory computer-readable storage medium storing instructions that when executed by a computer cause the computer to perform the method described herein.

Yet another aspect provides a network interface card (NIC) (e.g., as described above in relation to NIC 100 of FIG. 1, IXE 402 of FIG. 4, and IXE DTE 502 of FIG. 5) which comprises a command unit to receive, by a network interface card (NIC), a plurality of packets corresponding to a read request or a write request, wherein the packets are associated with a datatype descriptor stored in a datatype engine of the NIC, wherein each packet is associated with a precomputed context which indicates a value for each dimension of a multi-dimensional array and a start location of the respective packet within a block of a host memory. The NIC further comprises a context-generating unit to generate, for a respective packet, a datatype handle corresponding to the datatype descriptor and an offset indicating a position of the respective packet within the plurality of packets. The NIC further comprises a cache-managing unit to determine, based on the datatype handle and the offset, that a context for the respective packet is cached. The NIC further comprises a datatype engine-managing unit to initialize the datatype engine based on the cached context. The NIC further comprises a request-generating unit to generate, by the datatype engine based on the precomputed and cached context, a plurality of read requests or write requests comprising addresses and lengths, thereby allowing the NIC to process out-of-order packets based on the precomputed and cached context. The cache-managing unit is further to cache a current context when processing for the respective packet is complete. In a variation on this aspect, the precomputed context is stored in at least one of the host memory, a hot context random access memory (RAM), and a cold context random access memory (RAM).

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method executed by one or more processing elements, comprising:
   receiving, by a network interface card (NIC), a plurality of packets corresponding to a read request or a write request, wherein the packets are associated with a datatype descriptor stored in a datatype engine of the NIC,
   wherein each packet is associated with a precomputed context which indicates a value for each dimension of a multi-dimensional array and a start location of the respective packet within a block of a host memory,
   wherein the datatype descriptor comprises at least one of:
      a representation of the multi-dimensional array which includes a number of elements in each dimension, a size of a block to be transferred, and a stride in each dimension, wherein the representation of the multi-dimensional array indicates a handle to a previous datatype and a name for a new datatype; or
      a reference to an input/output vector (IOVEC) which indicates addresses and lengths of data to be read from or written to the host memory;
   generating, for a respective packet, a datatype handle corresponding to the datatype descriptor and an offset indicating a position of the respective packet within the plurality of packets;
   determining, based on the datatype handle and the offset, that a context for the respective packet is cached;
   initializing the datatype engine based on the cached context;
   generating, by the datatype engine based on the precomputed and cached context, a plurality of read requests or write requests comprising addresses and lengths, thereby allowing the NIC to process out-of-order packets based on the precomputed and cached context; and
   caching a current context when processing for the respective packet is complete.

2. The method of claim 1, further comprising:
   responsive to determining that the context for the respective packet is not cached:
      retrieving the context from the host memory;
      caching the retrieved context;
      initializing the datatype engine based on the retrieved context;
      generating the plurality of write requests comprising addresses and lengths based on the retrieved context; and
      caching a current context when processing for the respective packet is complete.

3. The method of claim 1, further comprising:
   determining whether the respective packet is associated with a message which has already been received or is associated with a new message; and
   generating the offset based on whether the packet is associated with the message which has already been received or is associated with the new message.

4. The method of claim 3,
   wherein generating the offset is further based on information in the respective packet.

5. The method of claim 1,
   wherein the respective packet is received out-of-order within the plurality of packets, and
   wherein initializing the datatype engine based on the cached context causes the out-of-order packet to be processed correctly based on the generated datatype handle and offset.

6. The method of claim 1,
   wherein a respective context for a predetermined number of messages can be cached at one time.

7. The method of claim 1, wherein the precomputed context is stored in the host memory.

8. A non-transitory computer-readable storage medium storing instructions that when executed by a computer cause the computer to perform a method, the method comprising:
   receiving, by a network interface card (NIC), a plurality of packets corresponding to a read request or a write request, wherein the packets are associated with a datatype descriptor stored in a datatype engine of the NIC,
   wherein each packet is associated with a precomputed context which indicates a value for each dimension of a multi-dimensional array and a start location of the respective packet within a block of a host memory,
   wherein the datatype descriptor comprises at least one of:
      a representation of the multi-dimensional array which includes a number of elements in each dimension, a size of a block to be transferred, and a stride in each dimension, wherein the representation of the multi-dimensional array indicates a handle to a previous datatype and a name for a new datatype; or
      a reference to an input/output vector (IOVEC) which indicates addresses and lengths of data to be read from or written to the host memory;
   generating, for a respective packet, a datatype handle corresponding to the datatype descriptor and an offset indicating a position of the respective packet within the plurality of packets;
   determining, based on the datatype handle and the offset, that a context for the respective packet is cached;
   initializing the datatype engine based on the cached context;
   generating, by the datatype engine based on the precomputed and cached context, a plurality of read requests or write requests comprising addresses and lengths, thereby allowing the NIC to process out-of-order packets based on the precomputed and cached context; and
   caching a current context when processing for the respective packet is complete.

9. The non-transitory computer-readable storage medium of claim 8, wherein the method further comprises:
   responsive to determining that the context for the respective packet is not cached:
      retrieving the context from the host memory;
      caching the retrieved context;
      initializing the datatype engine based on the retrieved context;
      generating the plurality of write requests comprising addresses and lengths based on the retrieved context; and caching a current context when processing for the respective packet is complete.

10. The non-transitory computer-readable storage medium of claim 8, wherein the method further comprises:
   determining whether the respective packet is associated with a message which has already been received or is associated with a new message; and
   generating the offset based on whether the packet is associated with the message which has already been received or is associated with the new message.

11. The non-transitory computer-readable storage medium of claim 10,
   wherein generating the offset is further based on information in the respective packet.

12. The non-transitory computer-readable storage medium of claim 8,
   wherein the respective packet is received out-of-order within the plurality of packets, and
   wherein initializing the datatype engine based on the cached context causes the out-of-order packet to be processed correctly based on the generated datatype handle and offset.

13. The non-transitory computer-readable storage medium of claim 8, wherein the precomputed context is stored in the host memory.

14. A network interface card, comprising:
   a command unit to receive, by a network interface card (NIC), a plurality of packets corresponding to a read request or a write request, wherein the packets are associated with a datatype descriptor stored in a datatype engine of the NIC,
   wherein each packet is associated with a precomputed context which indicates a value for each dimension of a multi-dimensional array and a start location of the respective packet within a block of a host memory,
   wherein the datatype descriptor comprises at least one of:
      a representation of the multi-dimensional array which includes a number of elements in each dimension, a size of a block to be transferred, and a stride in each dimension, wherein the representation of the multi-dimensional array indicates a handle to a previous datatype and a name for a new datatype; or
      a reference to an input/output vector (IOVEC) which indicates addresses and lengths of data to be read from or written to the host memory;
   a context-generating unit to generate, for a respective packet, a datatype handle corresponding to the datatype descriptor and an offset indicating a position of the respective packet within the plurality of packets;
   a cache-managing unit to determine, based on the datatype handle and the offset, that a context for the respective packet is cached;
   a datatype engine-managing unit to initialize the datatype engine based on the cached context; and
   a request-generating unit to generate, by the datatype engine based on the precomputed and cached context, a plurality of read requests or write requests comprising addresses and lengths, thereby allowing the NIC to process out-of-order packets based on the precomputed and cached context; and
   wherein the cache-managing unit is further to cache a current context when processing for the respective packet is complete.

15. The network interface card of claim 14,
   wherein responsive to the cache-managing unit determining that the context for the respective packet is not cached:
      the datatype engine-managing unit is further to retrieve the context from the host memory;
      the cache-managing unit is further to cache the retrieved context;
      the datatype engine-managing unit is further to initialize the datatype engine based on the retrieved context;
      the request-generating unit is further to generate the plurality of write requests comprising addresses and lengths based on the retrieved context; and
   wherein the cache-managing unit is further to cache a current context when processing for the respective packet is complete.

16. The network interface card of claim 14,
   wherein the command unit is further to determine whether the respective packet is associated with a message which has already been received or is associated with a new message; and
   wherein the context-generating unit is further to generate the offset based on whether the packet is associated with the message which has already been received or is associated with the new message and further based on information in the respective packet.

17. The network interface card of claim 14,
   wherein the respective packet is received out-of-order within the plurality of packets, and
   wherein initializing the datatype engine based on the cached context causes the out-of-order packet to be processed correctly based on the generated datatype handle and offset.

18. The network interface card of claim 14, wherein the precomputed context is stored in at least one of the host memory, a hot context random access memory (RAM), and a cold context random access memory (RAM).

19. The non-transitory computer-readable storage medium of claim 8,
   wherein a respective context for a predetermined number of messages can be cached at one time.

20. The network interface card of claim 14,
   wherein a respective context for a predetermined number of messages can be cached at one time.

* * * * *